US010108067B2

(12) United States Patent
Yoshimura

(10) Patent No.: US 10,108,067 B2
(45) Date of Patent: Oct. 23, 2018

(54) GASOCHROMIC DIMMING MECHANISM

(71) Applicant: Kazuki Yoshimura, Aichi (JP)

(72) Inventor: Kazuki Yoshimura, Aichi (JP)

(73) Assignee: National Institute of Advanced Industrial Science and Technology, Tokyo (JP)

(*) Notice: Subject to any disclaimer, the term of this patent is extended or adjusted under 35 U.S.C. 154(b) by 0 days.

(21) Appl. No.: 15/538,268

(22) PCT Filed: Dec. 18, 2015

(86) PCT No.: PCT/JP2015/085579
§ 371 (c)(1),
(2) Date: Jun. 21, 2017

(87) PCT Pub. No.: WO2016/104385
PCT Pub. Date: Jun. 30, 2016

(65) Prior Publication Data
US 2018/0004060 A1 Jan. 4, 2018

(30) Foreign Application Priority Data
Dec. 26, 2014 (JP) ................ 2014-265737

(51) Int. Cl.
G02F 1/17 (2006.01)
C25B 11/03 (2006.01)
(Continued)

(52) U.S. Cl.
CPC .............. G02F 1/17 (2013.01); C25B 1/10 (2013.01); C25B 9/00 (2013.01); C25B 9/10 (2013.01);
(Continued)

(58) Field of Classification Search
CPC ....... B82Y 20/00; G02F 1/01708; G02F 1/01; G02F 1/0126; G02F 1/19
(Continued)

(56) References Cited

U.S. PATENT DOCUMENTS

2004/0206024 A1 10/2004 Graf et al.
2009/0303567 A1 12/2009 Scherer
(Continued)

FOREIGN PATENT DOCUMENTS

JP 2009-505926 2/2009
JP 2010-018840 1/2010
(Continued)

OTHER PUBLICATIONS

International Search Report for PCT/JP2015/085579 dated Feb. 16, 2016.
(Continued)

Primary Examiner — Mohammed Hasan
(74) Attorney, Agent, or Firm — IPUSA, PLLC

(57) ABSTRACT

In an aspect of the present invention, a gasochromic dimming mechanism is provided which includes a gasochromic dimming component provided with a pair of transparent substrates, the transparent substrates being arranged to face each other, and a dimming part formed on one or both facing surfaces of the pair of the transparent substrates, wherein an optical property of the dimming part is reversibly changed by hydrogenation and dehydrogenation; and a hydrogen-air mixture gas supply unit that supplies a hydrogen-air mixture gas between the pair of the transparent substrates. The hydrogen-air mixture gas supply unit includes an electrolysis cell including a mixer for mixing hydrogen and air, a polymer electrolyte membrane, a porous electrode formed in the polymer electrolyte membrane as an anode, and an air
(Continued)

supply unit that supplies the air to the mixer, the porous electrode being arranged on a flow channel of the air.

4 Claims, 8 Drawing Sheets

(51) Int. Cl.
| | |
|---|---|
| *C25B 1/10* | (2006.01) |
| *C25B 9/00* | (2006.01) |
| *C25B 9/10* | (2006.01) |
| *G02F 1/01* | (2006.01) |
| *E06B 3/67* | (2006.01) |
| *G02F 1/19* | (2006.01) |
| *E06B 3/677* | (2006.01) |
| *E06B 9/24* | (2006.01) |

(52) U.S. Cl.
CPC ............ *C25B 11/03* (2013.01); *E06B 3/6722* (2013.01); *G02F 1/0102* (2013.01); *G02F 1/19* (2013.01); *E06B 3/677* (2013.01); *E06B 9/24* (2013.01); *Y02E 60/366* (2013.01)

(58) Field of Classification Search
USPC ........................................................ 359/240
See application file for complete search history.

(56) References Cited

U.S. PATENT DOCUMENTS

| | | | |
|---|---|---|---|
| 2014/0085701 A1* | 3/2014 | Selles | ............... B32B 17/10036 |
| | | | 359/275 |
| 2014/0340729 A1* | 11/2014 | Tajima | .................. G02F 1/1523 |
| | | | 359/266 |
| 2015/0168801 A1 | 6/2015 | Yamada et al. | |
| 2015/0354265 A1* | 12/2015 | Yoshimura | ................ G02F 1/15 |
| | | | 359/240 |

FOREIGN PATENT DOCUMENTS

| | | |
|---|---|---|
| JP | 2014-026262 | 2/2014 |
| JP | 2014-134676 | 7/2014 |

OTHER PUBLICATIONS

Kazuki Yoshimura et al., New Switchable Mirror Sheet Using Gasochromic Switching Method, Proceeding of the 24th International Display Workshop, Dec. 2015.

Ryosai Technica Co., Ltd., the protective apparatus against dew condensation Electrolysis type Dehumidifying element / Dehumidifier ROSAHL, Sep. 2014, p. 1-p. 15 http://www.ryosai.co.jp/products/.

Korean Official Action for 10-2017-7020872 dated Jun. 19, 2018.

* cited by examiner

GASOCHROMIC DIMMING MECHANISM

TECHNICAL FIELD

The present invention relates to a gasochromic dimming mechanism.

BACKGROUND ART

In general, in a building, a window (an opening) is a place at which a large quantity of heat enters and exists. For example, a rate of losing heat through a window during heating in winter is approximately 48%, and a rate of heat entering through a window during cooling in summer reaches as much as approximately 71%. Accordingly, by appropriately controlling light and heat at a window, an enormous energy saving effect can be obtained.

A dimming mechanism is developed in view of such an object, and it has a function for controlling inflow and outflow of light and heat.

There are several types of dimming elements used for such a dimming mechanism, and a gasochromic material, an electrochromic material, etc., have been studied.

In a dimming mechanism in which a gasochromic material is used as a dimming element, a thin film material in which transmittance changes by hydrogenation and dehydrogenation is deposited on a glass or a transparent sheet; and light transmittance can be switched by exposing the thin film material to a gas including hydrogen or oxygen.

For example, Patent Document 1 discloses a gasochromic dimming component including a pair of transparent substrates, the transparent substrate being arranged to face each other; a dimming part that is formed on one of or both surfaces of the pair of the transparent substrates, the surfaces facing each other, wherein an optical property of the dimming part reversibly changes by hydrogenation and dehydrogenation; a hydrogen supply unit that introduces a gas including hydrogen into a gap between the pair of the transparent substrates; and a dehydrogenation unit that removes hydrogen from the gap between the pair of the transparent substrates. Here, the pair of the transparent substrates is directly laminated through the dimming part, and the surfaces facing each other partially contact at a region at which the dimming part is formed.

According to the gasochromic dinning component disclosed in Patent Document 1, a structure is such that the transparent substrates are directly laminated through the dimming part without providing a spacer between them, so that the volume of a space between the transparent substrates is small. Consequently, an amount of hydrogen required for hydrogenating the dimming element can be reduced.

CITATION LIST

Patent Document

[Patent Document 1]: Japanese Unexamined Patent Publication No. 2014-134676

SUMMARY OF INVENTION

Technical Problem

Here, in a gasochromic dimming mechanism using a gasochromic material as a dimming element, when the dimming element is to be hydrogenated, there is a case in which a method is used such that, while using the air as a carrier gas, a mixture gas of hydrogen and the air, namely, a hydrogen-air mixture gas is introduced between a pair of transparent substrates.

In this manner, when the hydrogen-air mixture gas is introduced between the pair of the transparent substrates, hydrogen and oxygen coexist between the pair of the transparent substrates, so that water is generated by a reaction of hydrogen and oxygen to generate dew condensation between the pair of the transparent substrates. Furthermore, when the humidity in the surroundings is high and the humidity of the drawn air is high, dew condensation tends to occur particularly between the pair of the transparent substrates.

In the gasochromic dimming component disclosed in Patent Document 1, which is described above, a gap between the pair of the transparent substrates is narrow, so that water vapor pressure between the pair of the transparent substrates tends to exceed, in particular, saturated vapor pressure, and dew condensation tends to occur. Furthermore, the dimmer element may be weak against water depending on its material, so that the performance may be lowered when dew condensation occurs between the pair of the transparent substrates.

For the dew condensation that occurs when hydrogen and oxygen react due to coexistence of hydrogen and oxygen between the pair of the transparent substrates, by adjusting the hydrogen concentration, occurrence of the dew condensation can be suppressed.

However, when humidity in the surroundings is high and the humidity in the drawn air is high, it is difficult to suppress occurrence of dew condensation between the pair of the transparent substrates only by adjusting the hydrogen concentration.

In view of the above-described problem of the related art, an object of the present invention is to provide a gasochromic dimming mechanism capable of suppressing dew condensation from occurring between a pair of transparent substrates, even in an environment in which humidity in the surroundings is high.

Solution to Problems

According to an aspect of the present invention, there is provided a gasochromic dimming mechanism including a gasochromic dimming component provided with a pair of transparent substrates, the transparent substrates being arranged to face each other, and a dimming part that is formed on one or both facing surfaces of the pair of the transparent substrates, wherein an optical property of the dimming part is reversibly changed by hydrogenation and dehydrogenation; and a hydrogen-air mixture gas supply unit that supplies a hydrogen-air mixture gas between the pair of the transparent substrates, wherein the hydrogen-air mixture gas supply unit includes an electrolysis cell including a mixer for mixing hydrogen and air, a polymer electrolyte membrane, a porous electrode formed in the polymer electrolyte membrane as an anode, and an air supply unit that supplies the air to the mixer, the porous electrode being arranged on a flow channel of the air.

Advantageous Effects of the Invention

According to an aspect of the present invention, a gaschromatic dimming mechanism can be provided that is capable of suppressing dew condensation from occurring between a pair of transparent substrates, even in an environment in which the surrounding humidity is high.

DESCRIPTION OF EMBODIMENTS

Figure 1:
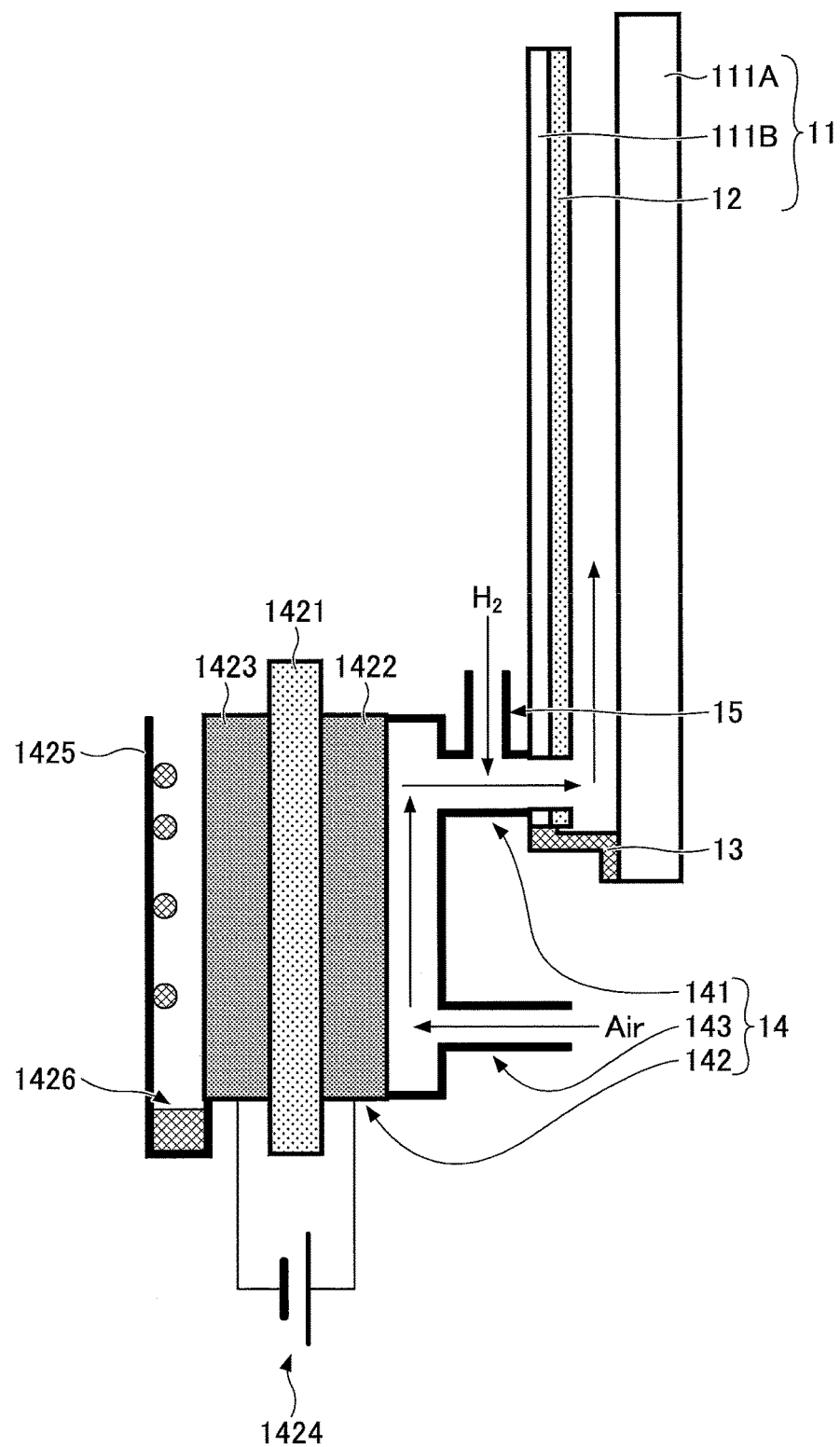
FIG. 1 is an illustration diagram of a gasochromic dimming mechanism according to an embodiment of the present invention.

In the following, an embodiment for implementing the present invention is described by referring to the drawings; however, the present invention is not limited to the embodiment described below, and various modifications and substitutions can be added to the embodiment described below, without departing from the scope of the present invention.

In the embodiment, a configuration example of a gasochromic dimming mechanism according to the embodiment is described.

The gasochromic dimming mechanism according to the embodiment may include a gasochromic dimming component provided with a pair of transparent substrates, the transparent substrates being arranged to face each other, and a dimming part that is formed on one or both facing surfaces of the pair of transparent substrates, wherein an optical property of the dimming part is reversibly changed by hydrogenation and dehydrogenation. The gasochromic dimming mechanism according to the embodiment may further include a hydrogen-air mixture gas supply unit that supplies a hydrogen-air mixture gas between the pair of transparent substrates.

Further, the hydrogen-air mixture gas supply unit may include a mixer for mixing hydrogen and the air; an electrolysis cell; and an air supply unit.

The electrolysis cell may include a polymer electrolyte membrane; and a porous electrode formed in the polymer electrolyte membrane as an anode. Furthermore, the porous electrode of the electrolysis cell is arranged on a flow channel of the air, and the air supply unit can supply the air to the mixer.

FIG. 1 is an illustration diagram schematically showing a cross section of the gasochromic dimming mechanism 10 according to the embodiment. Note that FIG. 1 shows the cross-sectional view of a gasochromic dimming component 11 included in the gasochromic dimming mechanism 10 on a plane parallel to a lamination direction of a pair of transparent substrates 111A and 111B.

In the following, each component included in the gasochromic dimming mechanism 10 according to the embodiment is described, while using FIG. 1.

First, the gasochromic dimming component 11 is described.

As described above, the gasochromic dimming component 11 may include the pair of the transparent substrates 111A and 111B arranged to face each other; and a dimming part 12. Note that, for convenience of the description, one of the transparent substrates may be referred to as a first transparent substrate 111A, and the other transparent substrate may be referred to as a second transparent substrate 111B.

In FIG. 1, a configuration is shown in which the thickness and the size of the first transparent substrate 111A are different from those of the second transparent substrate 111B; however, it is not limited to such an embodiment, and the thicknesses of them may be the same and the sizes of them may be the same, or the thicknesses may be different or the sizes may be different. Furthermore, for example, a dimming part may be formed on a surface of the transparent substrate 111A that faces the transparent substrate 111b.

The shapes of the first and second transparent substrates 111A and 111B are not limited to the flat plate shapes as in FIG. 1, and may have, for example, curved surfaces or spherical surfaces in their planes, and their shapes may be any shapes.

The material of the transparent substrates 111A and 111B is not particularly limited; however, they are components used in the gasochromic component 11 of the gasochromic mechanism 10 and they are components that transmit visible light, so that a material with high transmittance with respect to visible light is preferable. Accordingly, for example, the transparent substrates 111A and 111B may preferably be glass and/or a plastic. As the plastic, for example, acrylic, polycarbonate, polyethylene terephthalate (PET), polyethylene naphthalate (PEN), etc., may preferably be used.

The material of the transparent substrates 111A and 111B is not limited, and, especially, their thicknesses are not limited and may be selected according to the thickness and the strength required for the gasochromic dimming component 11. They may be in any state among sheet shapes, thin plate shapes, or thick plate shapes.

Furthermore, depending on necessity, openings, which are for connecting to a hydrogen-air mixture gas supply unit 14, may be formed in the transparent substrates 111A and 111B. The numbers, the shapes, etc., of the openings are not particularly limited; and openings of any number, shapes, and sizes can be provided. Note that, when openings are formed on the surfaces of the transparent substrates 111A and 111B, visibility may be affected, so that depending on a use, a pipe, etc., may be connected to a side surface side of the transparent substrates 111A and 111B so as to communicate with a gap between the transparent substrates 111A and 111B.

Next, the dimming part 12 is described.

A material and a configuration of the dimming part 12 are not particularly limited. It suffices if an optical property of a dimming element included in the dimming part 12 can be reversibly changed by hydrogenation and dehydrogenation.

As a material of a dimming element in which the optical property is reversibly changed by hydrogenation and dehydrogenation, two types of materials have been known; an absorption dimmer and a reflection dimmer. Specifically, a reflection dinner has been known as "switchable mirror thin film." As the dimming element of the gasochromic dimming mechanism 10 according to the embodiment, the reflection dimmer and/or the absorption dimmer can be used.

By performing hydrogenation and dehydrogenation, the reflection dimmer can switch between a transparent state and a mirror state in which light is reflected. In contrast, by performing hydrogenation and dehydrogenation, the absorption dimmer can switch between a transparent state and a colored state in which light is not transmitted.

As a dimming element of the reflection dimmer, for example, a magnesium alloy thin film can preferably be used; and, as a dimming element of the absorption dimmer, for example, a transition metal oxide thin film can preferably be used. Accordingly, as a dimming element, a magnesium alloy thin film and/or a transition metal oxide thin film can preferably be used.

As a dimming element of the reflection dimmer, a magnesium alloy thin film can preferably be used, as described above. In particular, a magnesium alloy thin film of magnesium and a transition metal can more preferably be used. Among them, from a perspective of endurance, a magnesium-nickel alloy thin film or a magnesium-yttrium alloy thin film can further preferably be used. Note that the magnesium-nickel alloy thin film or the magnesium-yttrium alloy thin film can be used, for example, by forming, as a catalyst layer, a palladium thin film on the thin film by vapor deposition, as described below.

As a dimming element of the absorption dimmer, a transition metal oxide thin film can preferably be used, as described above. In particular, a transition metal oxide thin film can more preferably be used that includes one or more materials selected from tungsten oxide, molybdenum oxide, chromium oxide, cobalt oxide, nickel oxide, and titanium oxide. Among them, from a perspective of coloring efficiency, a tungsten oxide ($WO_3$) thin film can more preferably be used. For example, when the tungsten oxide thin film is used as the absorption dimmer, by hydrogenation, the transparent state can be changed to a dark blue color. The tungsten oxide thin film can be used, for example, by forming, as a catalyst layer, a palladium thin film on the thin film by vapor deposition, as described below.

The thickness of the dimming element is not particularly limited, and it can be selected depending on an extent of required light transmission, etc. For example, for the reflection dimmer, a film thickness of one dimming element is preferably be greater than or equal to 30 nm and less than or equal to 100 nm. Furthermore, for the absorption dimmer, a film thickness of one dimming element is preferably be greater than or equal to 300 nm and less than or equal to 800 nm. Here, the film thickness of one dimming element means that a thickness of each dimming element when a configuration includes a plurality of dimming elements.

The method of forming a dimming element is not particularly limited. For example, it can be formed by a sputtering method, a vacuum evaporation method, an electron beam evaporation method, a chemical vapor deposition method, a sol-gel method, etc. It can be formed on one of or both surfaces of the transparent substrates facing each other.

A dimmer element may have a structure including only one layer; however, two or more layers may be laminated in the structure. When two or more layers are laminated, the structure may include only one of the reflection dimmer and the absorption dimmer, or may include both types of the dimming elements.

Furthermore, the dimming part 12 may preferably have a structure including the above-described dimming element in which an optical property is reversibly changed by hydrogenation and dehydrogenation, and a catalyst layer having a catalytic function for the hydrogenation and dehydrogenation reaction of the dimming element. The reason is that, by adopting such a structure, the reaction speed of the hydrogenation and dehydrogenation reaction of the dimming element can be increased. Specifically, for example, when a dimming element is formed on the first transparent substrate 111A, a catalyst layer may preferably be formed (laminated) on a surface not facing the first transparent substrate 111A, namely, a surface facing the second transparent substrate 111B, between the surfaces of the dimming element.

The material of the catalyst layer is not particularly limited, provided that the reaction speed of the hydrogenation and dehydrogenation reaction of the dimming element can be increased. However, a thin film of palladium and/or platinum is preferable, for example.

The film thickness of the catalyst layer is not particularly limited, and it can be freely selected based on cost or an extent of the required enhancement of the reaction speed. However, it is preferably greater than or equal to 2 nm and less than or equal to 10 nm.

The method of forming the catalyst layer is not particularly limited. For example, it can be formed by a sputtering method, a vacuum evaporation method, an electron beam evaporation method, a chemical vapor deposition method, etc.

Furthermore, it is more preferable that, in the structure, a buffer layer be formed between the dimming element and the catalyst layer so as to prevent mutual diffusion of the component of the dimming element and the component of the catalyst layer, and that, on the surface of the catalyst layer, a protection film be formed that transmits hydrogen and prevents oxidation of the dimming element. Namely, the dimming part 12 may include, in addition to the dimming element and the catalyst layer, the buffer layer and a protection film. By providing such a structure, endurance of the gasochromic dimming component 11 against repetition of switching between hydrogenation and dehydrogenation can be enhanced.

The buffer layer is not particularly limited, provided that mutual diffusion of the component of the dimming element (metal) and the component of the catalyst layer can be prevented. For example, a metal thin film of titanium, niobium, tantalum, or vanadium can be used.

The method of forming the buffer layer is not particularly limited. For example, it can be formed by a sputtering method, a vacuum evaporation method, an electron beam evaporation method, a chemical vapor deposition method, etc.

Furthermore, as the protection film, a layer having hydrogen permeability and water repellency can preferably be used. For the protection film, a material provided with permeability with respect to hydrogen (proton) and impermeability (water repellency) with respect to water can preferably be used. For example, for the protection film, polymers, such as polytetrafluoroethylene, polyvinyl acetate, polyvinyl chloride, polystyrene, and cellulose acetate, and inorganic thin films, such as a titanium oxide thin film, can preferably be used.

The protection film can be formed, for example, by a method of applying and drying a dispersing liquid in which a polymer is dispersed when it is a polymer film, and, for example, by a method of forming a film of an inorganic substance by the sputtering method when it is an inorganic film.

In FIG. 1, the example is illustrated in which the dimming part 12 is formed on the one side, which is the first transparent substrate 111A; however, it is not limited to such a configuration. For example, it may not be formed on the side of the first transparent substrate 111A, and it may be formed on the second transparent substrate 111B. Furthermore, the dimming part 12 may be formed on both the first transparent substrate 111A and the second transparent substrate 111B.

The method of facing the first transparent substrate 111A and the second transparent substrate 111B with each other and securing them is not particularly limited; however, for example, they can be secured by a securing member 13.

The securing member 13 is not particularly limited, provided that the member can secure the pair of the transparent substrates. However, for example, various types of adhesives and tape members can be used.

When the first transparent substrate 111A and the second transparent substrate 111B are secured by the securing member 13, a distance between the first transparent substrate 111A and the second transparent substrate 111B is not particularly limited, and it can be any distance. However, by shortening the distance between the transparent substrates, an amount of hydrogen required for hydrogenation can be reduced, so that switching of the dimming part 12 can be performed in a short time. Consequently, no space may preferably be provided between the pair of the transparent substrate 111A and 111B; the pair of the transparent substrates 111A and 111B may preferably be directly laminated through the dimming part 12; and the surfaces that face each other may preferably contact partially in the region in which the dimming part 12 is formed.

Next, the hydrogen-air mixture gas supply unit 14 is described.

On a day on which humidity around the gasochromic dimming mechanism 10 is high, humidity in the air that is used as a carrier gas of hydrogen is also high. Especially, when the gap between the pair of the transparent substrates 111A and 111B is narrow, even if an amount of water vapor generated in the gap is small, the water vapor pressure in the gap becomes high, and it easily exceeds saturation vapor pressure. As a result, dew condensation may occur between the pair of the transparent substrates 111A and 111B, and performance of the dimming part 12 may be lowered.

Thus, the gasochromic dimming mechanism 10 according to the embodiment can be configured such that, when the hydrogen-air mixture gas is supplied between the pair of the transparent substrates 111A and 111B by the hydrogen-air mixture gas supply unit 14, the water vapor in the air, which is to be mixed with hydrogen, can be reduced in advance. Then, by supplying the hydrogen-air mixture gas in which the humidity is reduced, occurrence of due condensation between the pair of the transparent substrates 111A and 111B can be suppressed regardless of the ambient humidity.

The hydrogen-air mixture gas supply unit 14 provided in the gasochromic dimming mechanism 10 according to the embodiment may include a mixer 141 for mixing hydrogen and the air; an electrolysis cell 142; and an air supply unit 143.

Then, the electrolysis cell 142 may include a polymer electrolyte membrane 1421 and a porous electrode 1422 formed in the polymer electrolyte membrane as an anode.

Furthermore, in the air supply unit 143, the porous electrode 1422 is disposed on a flow channel of the air, and the air can be supplied to the mixer 141.

In the hydrogen-air mixture gas supply unit 14, for removing the water vapor in the air, the electrolysis cell 142 provided with the porous electrode 1422 as the anode can be used. The electrolysis cell 142 may have a structure such that the porous electrode 1422, as the anode, is attached to the polymer electrolyte membrane 1421. In the electrolysis cell 142, the porous electrode 1422 adsorbs water vapor in the air as water, so that, for example, upon applying, by a voltage application unit 1424, a voltage of approximately 3V between the electrodes, the adsorbed water can be decomposed into oxygen and hydrogen. By continuously applying the voltage by the voltage application unit 1424 while supplying the air, adsorption of water vapor in the air supplied by the air supply unit 143 and decomposition of the adsorbed water occur continuously, and the humidity in the air can be reduced. Oxygen generated by decomposition becomes gas on the anode side and mixes with the air. Furthermore, the generated hydrogen moves toward the cathode side and reacts with oxygen in the air contacting the cathode to become water vapor.

The polymer electrolyte membrane 1421 of the electrolysis cell 142 is not particularly limited; however, for example, Nafion (registered trademark) film, etc., can preferably be used.

Furthermore, a material of the porous electrode 1422 is not particularly limited, provided that the material has electric conductivity and has pores suitable for adsorbing water vapor in the air. For example, a platinum-plated titanium mesh, etc., can preferably be used. Furthermore, in order to sufficiently enhance the performance of adsorbing water vapor, a catalyst may preferably be applied to the surface of the porous electrode 1422. At this time, the catalyst to be used is not particularly limited; however, for example, p-type lead dioxide, etc., can preferably be used.

In the electrolysis cell 142, a structure of the cathode 1423 is not particularly limited, and it can be any structure; however, for example, a porous electrode may be disposed, similar to the anode. In addition, the cathode 1423 may have a structure in which catalyst layers, which are formed of carbon powder such that platinum is supported on a surface of carbon paper, are laminated.

The air supply unit 143 can draw the air from an intake port of the air by a small pump, etc., and can supply the air to the mixer 141. Then, a structure is preferable such that the porous electrode 1422 provided as the anode of the electrolysis cell 142 is disposed on the flow channel of the air that extends from the air intake port to the mixer 141, so that the porous electrode 1422 and the air contact each other. With this configuration, water vapor in the air drawn from the air intake port is adsorbed and decomposed by the porous electrode 1422 provided as the anode of the electrolysis cell 142 as described above, so that the air in which the humidity is reduced can be supplied to the mixer 141.

Note that, in the gasochromic dimming mechanism 10 illustrated in FIG. 1, an example is shown in which the porous electrode 1422 is provided so as to close a part of the cross section in the air traveling direction in a part of the flow channel of the air. However, it is not limited to such a configuration. For example, in a part of the flow channel of the air, the porous electrode 1422 may be provided so as to block the entire cross section perpendicular to the air traveling direction.

The extent of removing water vapor in the air in the electrolysis cell 142 so as not to generate dew condensation between the pair of the transparent substrates 111A and 111B, namely, the extent of dehumidification is not particularly limited; and it can be freely selected, for example, depending on humidity of the drawn air, or a distance between the pair of the transparent electrodes 111A and 111B, etc.

For example, during dehumidification, in order to more reliably suppress occurrence of dew condensation while suppressing the power applied to the polymer electrolyte membrane 1421 of the electrolysis cell 142, humidity in the drawn air or in the surrounding air may be measured with a hygrometer, and the power applied to the electrolysis cell 142 may be adjusted based on the measured value.

Furthermore, information about humidity may be obtained from the relationship between the voltage applied to the electrolysis cell 142 and the electric current, without using a hygrometer, etc. For example, when humidity in the drawn air is low, upon applying a predetermined voltage to the electrolysis cell 142, initially, a large electric current flows, and it attenuates in a short time. In contrast, when humidity in the drawn air is high, upon applying the predetermined voltage to the electrolysis cell 142, the time required for attenuating the electric current becomes long.

Consequently, it is possible to estimate the humidity in the drawn air, namely, the ambient humidity from the reaction of the electric current upon applying the voltage to the electrolysis cell 1422, specifically, to the polymer electrolyte membrane 1421. In this manner, the electrolysis cell 142 can be caused to function as a humidity sensor while removing humidity. Consequently, it can be configured, by using the electrolysis cell 142 as a humidity sensor without providing, in particular, a hygrometer, so that the extent of removing water vapor from the drawn air, namely, an operating condition of the electrolysis cell 142 can be selected based on the humidity detected by the electrolysis cell 142.

Then, in the mixer 141, the dehumidified air is mixed with hydrogen supplied from a hydrogen supply unit 15 to be supplied between the pair of transparent substrates 111A and 111B. The method of mixing, in the mixer 141, the dehumidified air with hydrogen supplied from the hydrogen supply unit 15 is not particularly limited. For example, as illustrated in FIG. 1, the T-shaped pipe can be configured. Alternatively, a mixer for various types of gases may be adopted.

The configuration example of the gasochromic dimming mechanism 10 according to the embodiment is described above. However, the gasochromic dimming mechanism 10 according to the embodiment may further include an optional configuration.

For example, in response to applying a voltage to the electrolysis cell, water vapor is generated. When the water vapor pressure of the water vapor generated at the side of the cathode 1423 of the polymer electrolyte membrane 1421 exceeds the saturated vapor pressure, dew condensation occurs and water is generated. The gasochromic dimming mechanism 10 according to the embodiment may further include a water collection unit for collecting the generated water.

The configuration of the water collection unit is not particularly limited. However, as illustrated in FIG. 1, it may include a cover 1425 for collecting water generated at the side of the cathode 1423 of the electrolysis cell 142; and a water collecting part 1426 for collecting moisture deposited on the inner surface of the cover 1425.

As illustrated in FIG. 1, when a voltage is applied to the polymer electrolyte membrane 1421 while attaching the cover 1425 to the side of the cathode 1423 of the electrolysis cell 142, so that the cathode 1423 contacts the narrow space, water vapor is released into the space on the side of the cathode 1423. Consequently, as described above, when the air is conveyed to the side of the porous electrode 1422, which is the anode, and the space at the side of the cathode 1423 is narrow, water vapor is condensed, and humidity in the space formed by the cover 1425 at the side of the cathode 1423 increases.

When the waterdrops fall into the water collecting part 1426, the water generated on the side of the cathode 1423 can be collected. When the waterdrops fall into the water collecting part 1426, the water generated on the side of the cathode 1423 can be collected.

At this time, a super water repellent coat may preferably be applied to the inner wall of the cover 1425, so that the waterdrops deposited on the inner wall of the cover 1425 can be easily collected. Furthermore, by providing a cooler on the outer surface of the cover 1425 so as to lower the saturated vapor pressure in the inner space, waterdrops can be easily deposited on the inner wall of the cover 1425 by dew condensation. The cooler is not particularly limited. However, for example, when a metal with fins for air-cooling is used, for example, as the cover 1425, it is cooled naturally by the surrounding air, so that dew condensation tends to occur, and the liquid water can be collected.

Note that, if oxygen on the side of the cathode 1423 is insufficient, hydrogen is generated instead of water vapor at the cathode 1423. For this reason, when the cover 1425 is formed, an opening may preferably be formed, so that oxygen can be continuously supplied to the cathode 1423.

In the gasochromic dimming mechanism 10, in order to perform hydrogenation of the dimming part 12, hydrogen is required. Especially, when hydrogenation of the dimming part 12 with a large area is to be performed, a large amount of hydrogen is required. However, there is a problem with handling of hydrogen because it is a gas.

Accordingly, when hydrogenation of the dimming part 12 with a large area is to be performed, it is preferable to supply hydrogen by performing electrolysis of liquid water. Then, as described above, by collecting the water generated in the electrolysis cell 142 by the water collecting unit and using it as water for generating hydrogen, it becomes unnecessary to supply liquid water, so that maintenance is not required and convenience can further be enhanced.

Note that, when electrolysis of liquid water is performed so as to supply hydrogen for performing hydrogenation of the dimming unit 12, as described below, an electrolysis cell for performing electrolysis of liquid water may further be included. In this case, for example, hydrogen generated by electrolysis of water is collected on the cathode side of the electrolysis cell so as to supply hydrogen to the mixer 141.

Furthermore, the hydrogen-air mixture gas supply unit 14 may further include a hydrogen collection and supply unit for collecting hydrogen generated at the side of the cathode 1423 of the polymer electrolyte membrane 1421 and for supplying hydrogen to the mixer 141.

As described above, when a voltage is applied to the electrolysis cell 142 to which the porous electrode 1422 is attached as an anode, water vapor in the air contacting the anode side is decomposed to release water vapor from the side of the cathode 1423. However, this is the case where oxygen contacts the side of the cathode 1423. When there is no oxygen, hydrogen is generated from the side of the cathode 1423.

Figure 2:
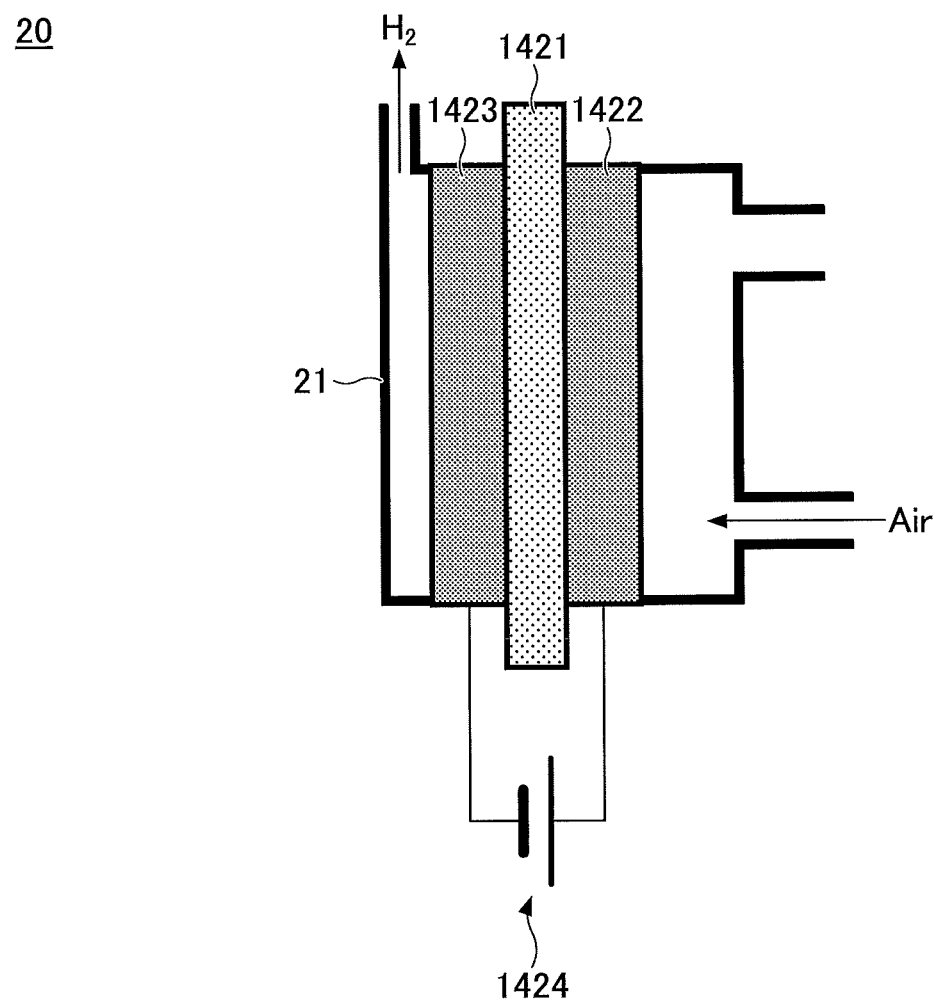
FIG. 2 is an illustration diagram of an electrolysis cell provided with a hydrogen collection and supply unit according to the embodiment of the present invention.

Here, FIG. 2 illustrates an example of the cross-sectional configuration when a hydrogen collection and supply unit 21 is provided on the side of the cathode 1423 of the electrolysis cell 20. Note that, in FIG. 2, the part of the electrolysis cell 20 at which the hydrogen collection and supply unit 21 is formed is enlarged and shown, and the description of other components is omitted.

As illustrated in FIG. 2, the internal volume of the hydrogen collection and supply unit 21 may preferably be made small as much as possible, so that supply of oxygen to the space surrounded by the cathode 1423 and the hydrogen collection and supply unit 21 can be suppressed compared to the case of the cover 1425 of FIG. 1. With such a configuration, water vapor is generated by oxygen that exists inside the space surrounded by the cathode 1423 and the hydrogen collection and supply unit 21, immediately after applying a voltage to the electrolysis cell 20. However, after oxygen inside the space is consumed, hydrogen is generated. Consequently, the hydrogen collection and supply unit 21 collects hydrogen and supplies hydrogen to the above-described mixer 141, and it can be used for performing hydrogenation of the dimming element of the dimming part 12.

Furthermore, in order to generate a large amount of hydrogen, it is desirable that the anode side of the electrolysis cell 20 for generating hydrogen is wet. For example, by placing a moisture absorbent so as to contact the porous electrode 1422 as the anode, more humidity in the air can be captured to wet the electrode surface. As the moisture absorbent, zeolite, HASClay (registered trademark), silica gel, etc., are effective. Usually, once the moisture absorbent absorbs water, then it does not absorb the moisture any more. However, as in this structure, when one end contacts the electrode of the electrolysis cell 20, moisture in that part is decomposed and regeneration occurs, so that adsorption and decomposition can be simultaneously applied to efficiently collect water and generate hydrogen.

Furthermore, the gasochromic dimming mechanism according to the embodiment may further include a heat collection and heating unit that collects heat generated in the electrolysis cell 142, and that heats the dimming part 12.

The heat collection and heating unit is not particularly limited. However, for example, a configuration may be adopted such that a pipe for collecting heat may be installed on the outer surface of the electrolysis cell 142, a pipe for heating may be installed on the periphery of the gasochromic dimming component 11, and both pipes are connected. Then, by circulating the air between the pipe installed on the outer surface of the electrolysis cell 142 and the pipe installed on the periphery of the gasochromic dimming component 11, the heat collection and heating unit can be formed.

By heating the dimming element included in the dimming part 12, the reaction speed of the dimming element can be increased. Furthermore, when the temperature of the dimming element is lower than or equal to 0° C., it becomes difficult to progress the reaction of hydrogenation and dehydrogenation. However, even in such a case, the reaction of hydrogenation and dehydrogenation can be progressed by heating the dimming element by the heat collection and heating unit.

Figure 3:
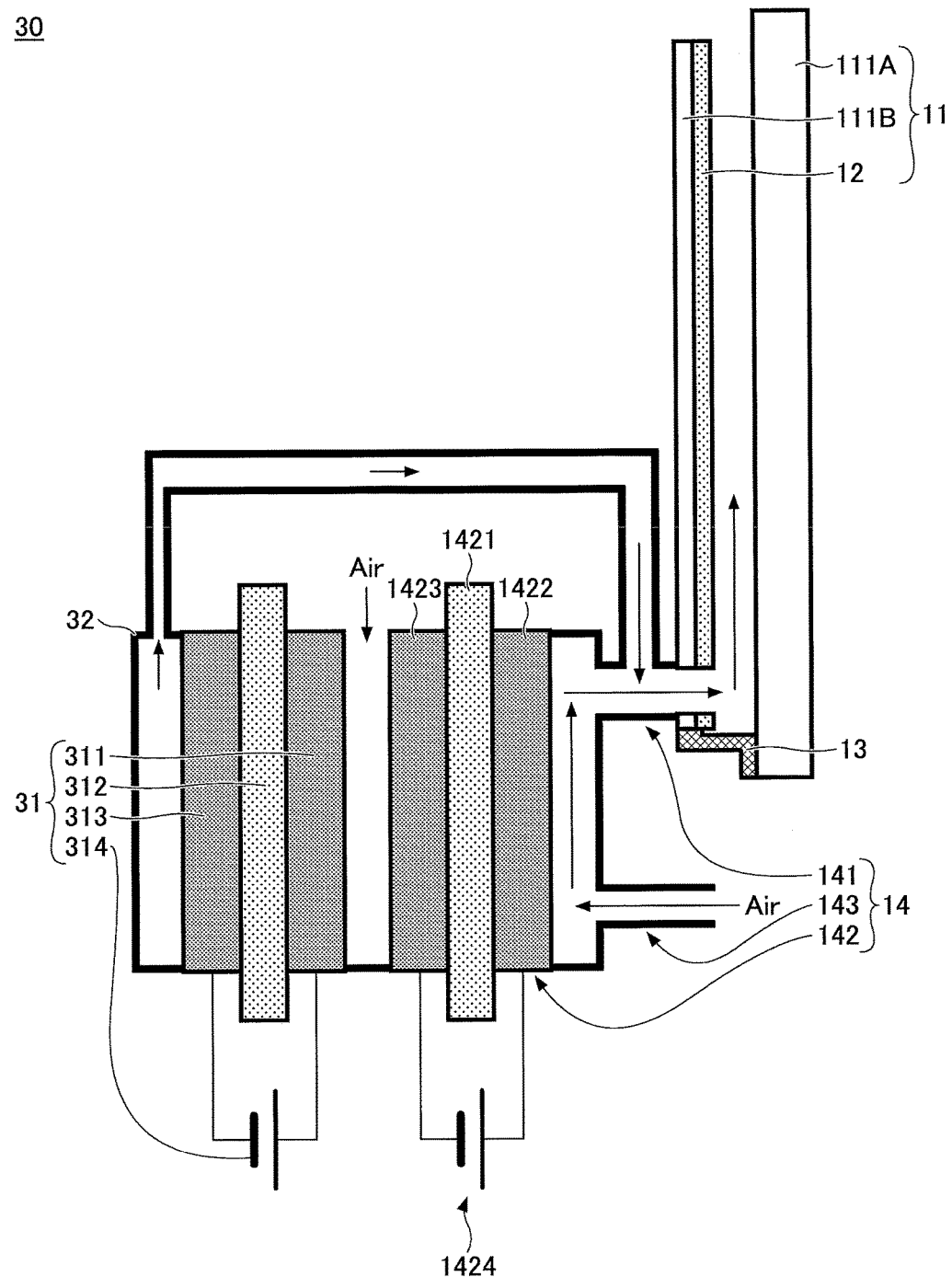
FIG. 3 is an illustration diagram of another configuration example of the gasochromic dimming mechanism according to the embodiment of the present invention.
Figure 4A:
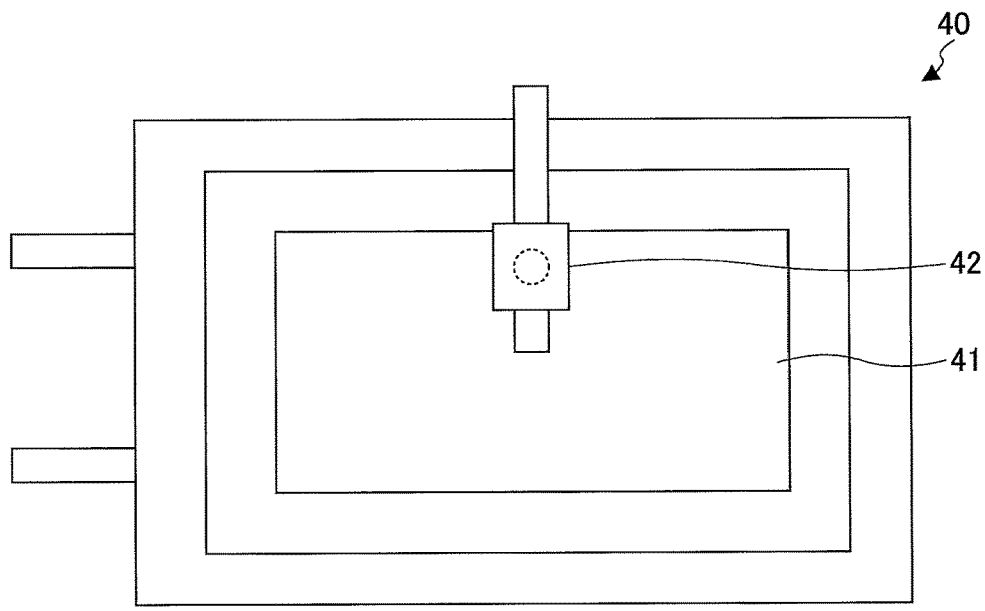
FIG. 4A is an illustration diagram (top view) of a switching mechanism according to the embodiment.
Figure 4B:
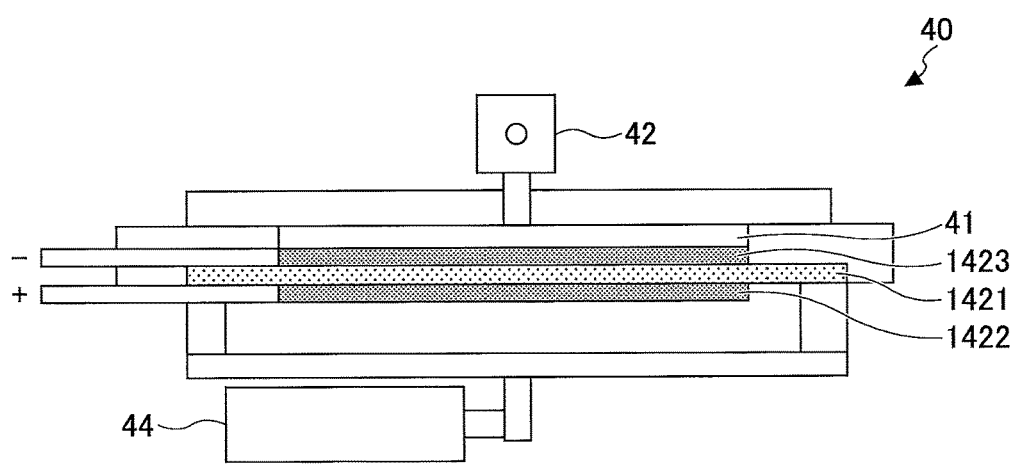
FIG. 4B is an illustration diagram (lateral side view) of the switching mechanism according to the embodiment.
Figure 4C:
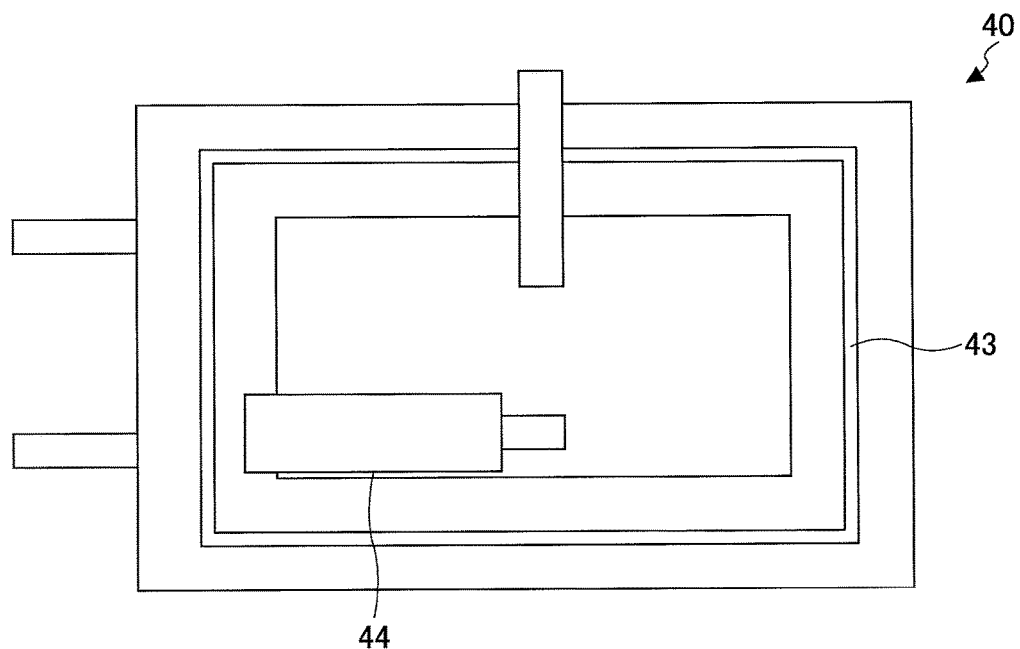
FIG. 4C is an illustration diagram (bottom view) of the switching mechanism according to the embodiment.
Figure 4D:
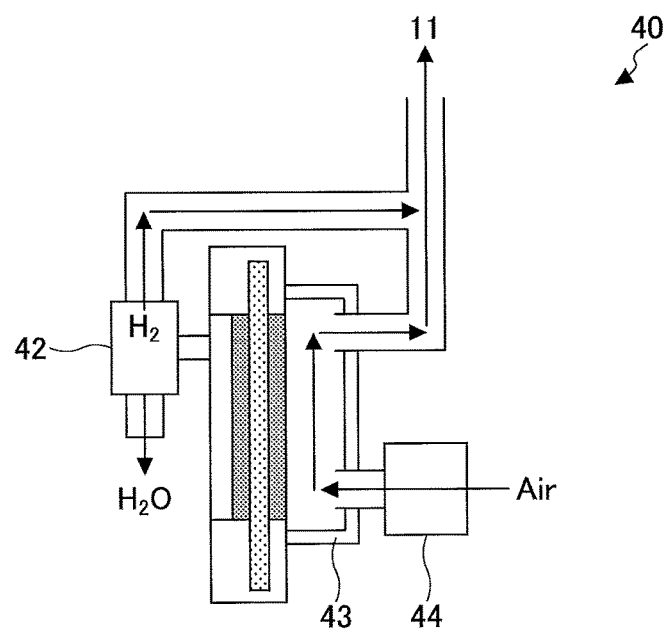
FIG. 4D is an illustration diagram (vertical side view) of the switching mechanism according to the embodiment.

Furthermore, in the gasochromic dimming mechanism according to the embodiment, another electrolysis cell (which is also described as "second electrolysis cell," hereinafter) 31 may be formed, as in the gasochromic dimming mechanism 30 illustrated in FIG. 3, for example. Note that, in FIG. 3, the same numbers are attached to components that are same as those of FIG. 1.

Similar to the electrolysis cell (which is also described as "first electrolysis cell," hereinafter) 142, the second electrolysis cell 31 may include a porous electrode 311 provided as an anode; a polymer electrolyte membrane 312; and a cathode 313. The cathode 313 may be provided with, for example, a hydrogen collection and supply unit 32.

Each component of the second electrolysis cell 31 is described.

The material of the porous electrode 311 provided as the anode is not particularly limited, and the material may preferably have electric conductivity and may have pores suitable for adsorbing water vapor in the air. Furthermore, a catalyst may preferably be applied to the surface of the porous electrode 311. As the material of the porous electrode 311 and the catalyst that can be suitably applied to the surface, the materials and the catalysts that are the same as those described for the porous electrode 142 of the first electrolysis cell 142 can suitably be used. Accordingly, the description is omitted here.

The polymer electrolyte membrane 312 may also be configured to be the same as the polymer electrolyte membrane 1421, and, for example, Nafion (registered trademark) film, etc., may be used.

The structure of the cathode 313 is not particularly limited, and it may have any structure. However, for example, similar to the anode, a porous electrode may be disposed. In addition, the cathode 313 may have a structure in which catalyst layers, which are formed of carbon powder such that platinum is supported on a surface of carbon paper, are laminated.

Note that a voltage application unit 314 may be provided that is for applying a voltage between the porous electrode 311 and the cathode 313.

As described above, when the first electrolysis cell 142 is used as a dehumidifier for removing moisture in the supplied air, water vapor is generated from the side of the cathode 1423. Note that, the air may preferably be supplied to the cathode 1423 as illustrated in FIG. 3, so that water vapor is continuously generated from the cathode 1423. Then, by supplying the generated water vapor to the side of the porous electrode 311, which is the anode of the second electrolysis cell 31, and by performing electrolysis in the second electrolysis cell 31, hydrogen can be generated at the side of the cathode 313, as described for the hydrogen collection and supply unit. The generated hydrogen can be collected by the hydrogen collection and supply unit 32 and can be supplied to the mixer 141.

In this manner, water vapor in the air can be removed by performing electrolysis in the first electrolysis cell 142, and the generated water vapor can be collected and hydrogen can be generated in the second electrolysis cell 31. Consequently, hydrogenation of the dimming part 12 can be performed by supplying the hydrogen-air mixture gas for hydrogenation of the dimming part 12 only by the first electrolysis cell 142 and the second electrolysis cell 31.

Furthermore, the gasochromic dimming mechanism according to the embodiment may further include a dehydrogenation unit for performing dehydrogenation of the dimming part 12.

The structure of the dehydrogenation unit is not particularly limited. In the gasochromic dimming component 11, dehydrogenation of the dimming part 12 occurs when the concentration of hydrogen in the gap between the transparent substrates becomes less than or equal to several %. As the dehydrogenation unit, for example, an opening may be formed between the pair of the transparent substrates 111A and 111B. Upon terminating supply of hydrogen, hydrogen naturally diffuses from the opening and the concentration of hydrogen decreases, so that dehydrogenation of the dimming part 12 occurs. The opening may be configured so that it is always opened. In this case, for hydrogenation of the dimming part 12, it can be configured such that an amount of hydrogen to compensate for hydrogen flowing out from the opening is to be supplied. Alternatively, a valve, etc., may be provided in the opening, so that it can be opened and closed at a desired timing. Furthermore, a pump, etc., may be connected to the opening, and hydrogen can be quickly discharged by forcibly introducing the air that does not include hydrogen.

As another configuration of the dehydrogenation unit, a configuration may be adopted in which the above-described hydrogen-air mixture gas supply unit 14 is used. When the hydrogen-air mixture gas supply unit 14 is used as the dehydrogenation unit, for the gasochromic dimming mechanism 10 illustrated in FIG. 1, it can preferably be configured such that, at the mixer 141, supply of hydrogen from the hydrogen supply unit 15 is stopped, and only the dehumidified air is supplied.

Consequently, even in an environment with high humidity in the surroundings, hydrogenation of the dimming element can be performed while suppressing occurrence of dew condensation between the pair of transparent substrates 111A and 111B.

EXAMPLES

[Gasochromic Dimming Mechanism 40]

The gasochromic dimming mechanism 40 illustrated in FIGS. 4A, 4B, 4C, and 4D is formed. Note that FIGS. 4A, 4B, 4C, and 4D are a top view, a lateral side view, a bottom view, and a vertical side view, respectively.

In the electrolysis cell 20, when oxygen exists on the side of the cathode 1423, no hydrogen is generated and water vapor is generated. Accordingly, a thin silicone rubber 41 is inserted into a recess of the cathode 1423 to fill the air layer, so that an amount of the oxygen included in the space is reduced. The silicone rubber 41 favorably causes hydrogen to pass through it, so that hydrogen can be extracted even in this way, and an amount of water vapor generated under existence of oxygen can be suppressed and hydrogen can be efficiently extracted. However, even with such a structure, oxygen remains and water vapor is generated, immediately after a voltage is applied to the electrolysis cell 20. Accordingly, a three-way valve 42 is attached to a pipe for extracting hydrogen, so that the generated water vapor can be released into the lower atmosphere for a while (cf. FIG. 4D). After approximately 20 seconds have elapsed from the application of the voltage to the electrolysis cell 20, generation of water vapor is stopped and hydrogen is generated. Thus, the three-way valve 42 is switched to discharge hydrogen upward. It is mixed with the air, and the hydrogen-air mixture gas is introduced into the gap in the gasochromic dimming component 11.

A plastic cover 43 is attached to the side of the porous electrode 1422 as the anode. The air is introduced from the lower side using a small pump 44; and, when it contacts the porous electrode 1422 as the anode, water vapor is removed to reduce humidity (cf. FIG. 4D). After that, the dried air is extracted from the upper side, it is mixed with hydrogen, and the hydrogen-air mixture gas is introduced into the gap in the gasochromic dimming component 11.

[Gasochromic Dimming Component 11]

Figure 5A:
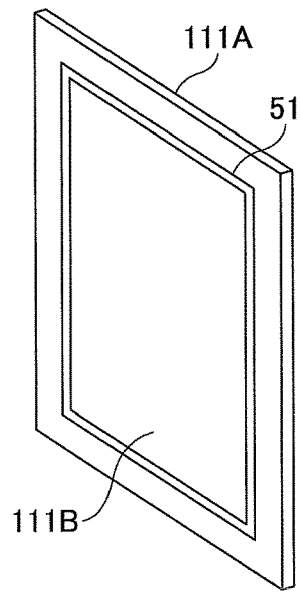
FIG. 5A is an illustration diagram (top perspective view) of a gasochromic dimming component according to the embodiment.
Figure 5B:
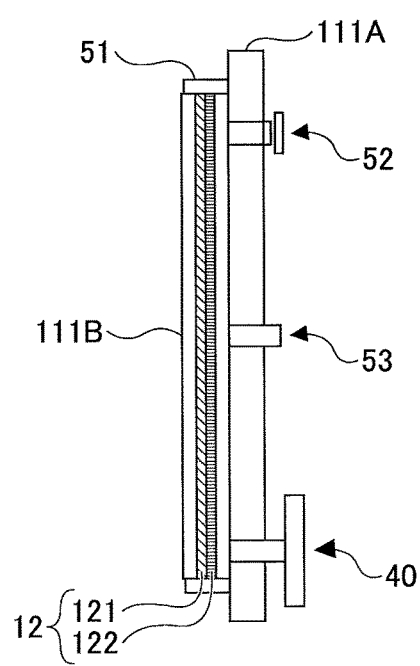
FIG. 5B is an illustration diagram (cross-sectional view) of the gasochromic dimming component according to the embodiment.
Figure 5C:
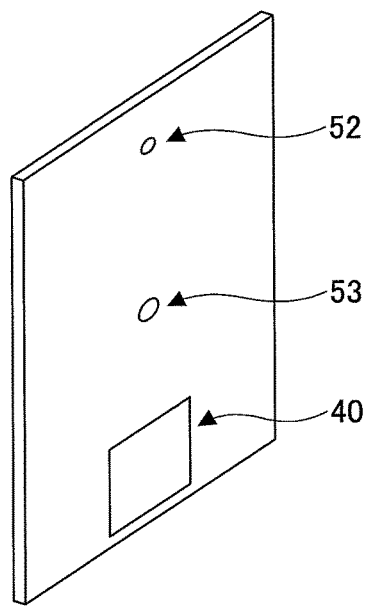
FIG. 5C is an illustration diagram (bottom perspective view) of the gasochromic dimming component according to the embodiment.

The gasochromic dimming component 11 illustrated in FIGS. 5A, 5B, and 5C was manufactured. Note that FIGS. 5A, 5B, and 5C are a top perspective view, a cross-sectional view, and a bottom perspective view, respectively.

As the transparent substrate 111B, a polycarbonate sheet of B4 size with a thickness of 0.5 mm was used. Using the sputtering method, the dimming part 12 was formed by sequentially depositing a thin film of $Mg_{0.5}Y_{0.5}$ with a thickness of approximately 40 nm, as the dimming element 121 of the reflection dimmer, and a palladium thin film with a thickness of approximately 7 nm, as the catalyst layer 122, on the transparent substrate 111B, and a dimmer sheet was obtained. At that time, the deposited dimming part 12 was in a mirror state.

The produced dimmer sheet was adhered to a transparent acrylic plate with a thickness of 5 mm, as the transparent substrate 111A, without a spacer, and four sides of the dimmer sheet were sealed with a sealing material 51. Even if the dimmer sheet was adhered to the transparent substrate 111A in this manner, a gap with a width of approximately 0.1 mm was automatically formed, and a gas could be introduced into this gap. A pipe for introducing a gas was attached to the lower center of the transparent substrate 111A, and a switching mechanism 40 was connected. A check valve 52 was attached to the upper center of the transparent substrate 111A. Additionally, a humidity sensor 53 for measuring the relative humidity of the gap was also attached to the central part of the transparent substrate 111A.

[Switching]

First, a voltage of 5 V was applied to the electrolysis cell 20, and the small pump 44 was operated to send the air with a flow rate of 100 sccm into the gap of the gasochromic dimming component 11. At that time, the three-way valve 42 was opened downward, so that generated water vapor was released at the beginning.

Figure 6:
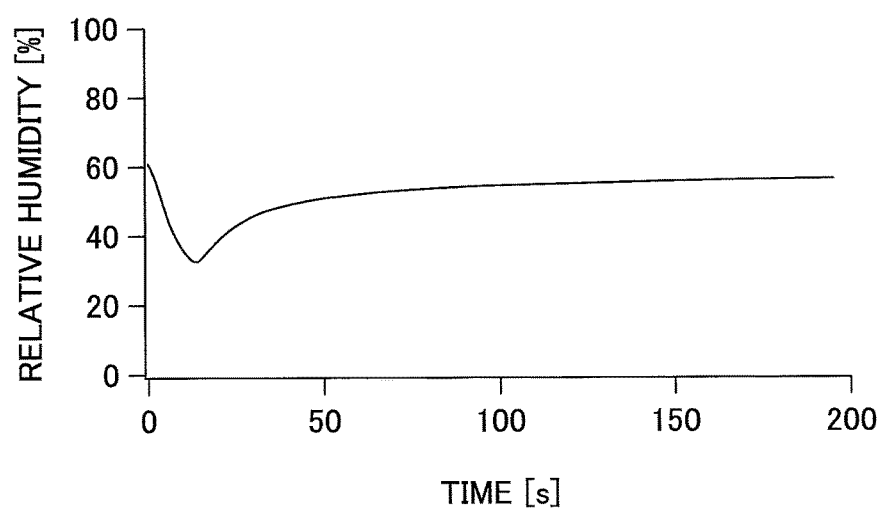
FIG. 6 is a diagram illustrating a variation in relative humidity in a gap of the gasochromic dimming mechanism according to the embodiment.

FIG. 6 shows a change in the relative humidity in the gap of the gasochromic dimming component 11. At this time, the ambient temperature was 24° C., and the saturated vapor pressure was 30 hPa. Accordingly, the relative humidity is a value obtained by dividing the water vapor pressure in the gap by the saturated vapor pressure.

It can be seen from FIG. 6 that the relative humidity prior to application of the voltage to the electrolysis cell 20 in the gap of the gasochromic dimming component 11 was approximately the same as the relative humidity in the room, and it was approximately 60%. Subsequently, when the voltage was applied to the electrolysis cell 20, the water vapor included in the air was adsorbed by the porous electrode 1422 while passing through the plastic cover 43 of the electrolysis cell 20, so that the relative humidity in the air decreased. As the dried air was sent, the relative humidity in the gap of the gasochromic dimming component 11 decreased.

By switching the three-way valve 42 to upward twenty seconds after the application of the voltage to the electrolysis cell 20, hydrogen generated at the side of the cathode 1423 was mixed with the dried air, and the hydrogen-air mixture gas was introduced into the gap of the gasochromic dimming component 11. As a result, the hydrogen concentration in the gap of the gasochromic dimming component 11 became approximately 10%, and the thin film of $Mg_{0.5}Y_{0.5}$ in the mirror state was hydrogenated to be in a transparent state. By introducing this hydrogen, the water vapor pressure was slightly increased. However, it did not exceed the level prior to the application of the voltage to the electrolysis cell 20.

If hydrogen is introduced without being mixed with the dried air, hydrogen in the mixture gas is burned by the catalytic reaction of the palladium thin film to generate water vapor, so that the relative humidity in the gap of the gasochromic dimming component 11 increases. When the relative humidity in the gap of the gasochromic dimming component 11 exceeds 80%, dew condensation occurs, and the thin film of $Mg_{0.5}Y_{0.5}$, which is the dimming element, dissolves and a hole is made.

In the embodiment, the relative humidity in the gap of the gasochromic dimming component 11 is lowered in advance, so that, even if water vapor is generated as a result of introducing hydrogen, the relative humidity in the gap of the gasochromic dimming component 11 does not exceed 80%, and dew condensation does not occur.

In the embodiment, the electrolysis cell 20 simultaneously performs two functions of removing water vapor and generating hydrogen.

Here, when the small pump 44 is stopped and the application of the voltage to the electrolysis cell 20 is also stopped, hydrogen is sealed by the check valve 52, and the transparent state is maintained.

When the air is sent by the small pump 44, the hydrogen concentration in the gap of the gasochromic dimming component 11 decreases, and the thin film of $Mg_{0.5}Y_{0.5}$ in the transparent state is dehydrogenated to return to the mirror state.

Figure 7:
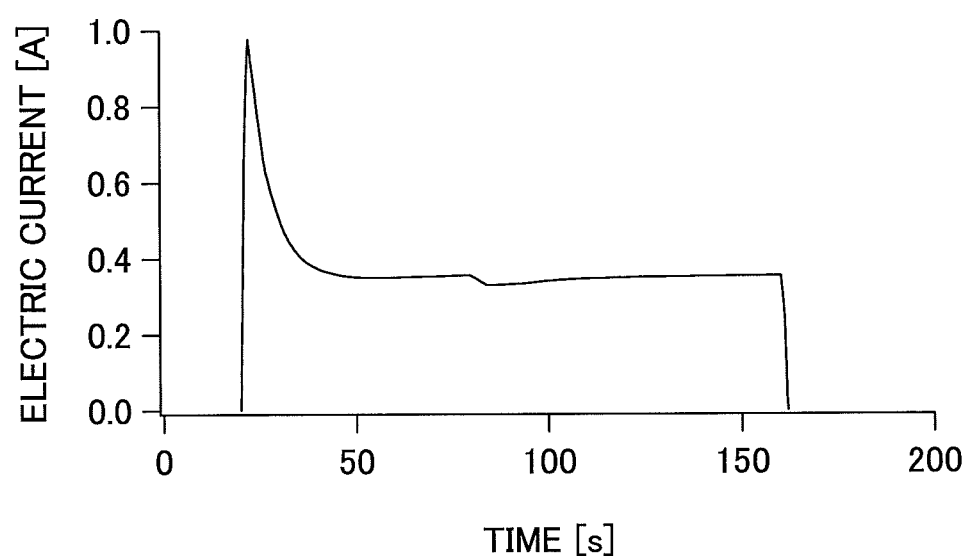
FIG. 7 is a diagram illustrating a variation in an electric current that flows when a voltage of 5 V is applied to the electrolysis cell according to the embodiment.

FIG. 7 shows a change in an electric current that flows when the voltage of 5V is applied to the electrolysis cell 20.

From FIG. 7, it can be seen that a large electric current of approximately 1 A flows at the beginning, it is attenuated immediately, and it reaches a constant value eventually. The three-way valve 42 that had been switched to upward was returned to downward at the time of 80 seconds. As a result, oxygen entered the side of the porous electrode 1422 as the anode of the electrolysis cell 20, and the electric current value temporarily decreased. However, after the oxygen was consumed, it returned to the original electric current value.

The value of the electric current in this constant state reflects the humidity in the room. In this case, the relative humidity in the room was approximately 60%, and the value of the electric current became stable at 0.35 A. In contrast, when the relative humidity in the room is approximately 80%, the value of the electric current becomes stable at approximately 0.6 A; and when the relative humidity in the room is approximately 40%, the value of the electric current becomes stable at approximately 0.2 A. Consequently, the humidity in the room can be found by the value of the electric current.

The present international application is based on and claims the benefit of priority of Japanese Patent Application No. 2014-265737, filed on Dec. 26, 2014, the entire contents of Japanese Patent Application No. 2014-265737 are hereby incorporated herein by reference.

10, 30, 40: gasochromic dimming mechanism
11: gasochromic dimming component
111A, 111B: transparent substrate
12: dimming part
14: hydrogen-air mixture gas supply unit
141: mixer
142, 20, 31: electrolysis cell
1421, 312: polymer electrolyte membrane
1422, 311: porous electrode
1423, 313: cathode
1424, 314: voltage application unit
1425: cover
1426: water collecting part
143: air supply unit
15: hydrogen supply unit
21, 32: hydrogen collection and supply unit

The invention claimed is:

1. A gasochromic dimming mechanism comprising:
a gasochromic dimming component provided with a pair of transparent substrates, the transparent substrates being arranged to face each other, and a dimming part that is formed on one or both facing surfaces of the pair of the transparent substrates, wherein an optical property of the dimming part is reversibly changed by hydrogenation and dehydrogenation; and
a hydrogen-air mixture gas supply unit that supplies a hydrogen-air mixture gas between the pair of the transparent substrates,
wherein the hydrogen-air mixture gas supply unit includes a mixer for mixing hydrogen and air; an electrolysis cell including a polymer electrolyte membrane, a porous electrode as an anode, and a cathode; and an air supply unit including a flow channel for supplying the air to the mixer,
wherein the porous electrode is attached to the polymer electrolyte membrane, and
wherein the porous electrode is disposed on the flow channel for supplying the air so that the porous electrode absorbs water vapor in the air as water.

2. The gasochromic dimming mechanism according to claim 1, wherein the hydrogen-air mixture gas supply unit further includes a hydrogen collection and supply unit that collects hydrogen generated at the cathode of the polymer electrolyte membrane and that supplies hydrogen to the mixer.

3. The gasochromic dimming mechanism according to claim 1, further comprising:
a water collection unit that collects water generated at the cathode of the polymer electrolyte membrane.

4. The gasochromic dimming mechanism according to claim 1, further comprising:
a heat collection and heating unit that collects heat generated at the electrolysis cell and that heats the dimming part.

* * * * *